(12) United States Patent
Kern et al.

(10) Patent No.: US 9,251,018 B2
(45) Date of Patent: Feb. 2, 2016

(54) ENHANCED RECOVERY OF HIGHLY AVAILABLE COMPUTING SYSTEMS

(71) Applicant: International Business Machines Corporation, Armonk, NY (US)

(72) Inventors: Robert F. Kern, Otter Rock, OR (US); David B. Petersen, Great Falls, VA (US)

(73) Assignee: International Business Machines Corporation, Armonk, NY (US)

(*) Notice: Subject to any disclaimer, the term of this patent is extended or adjusted under 35 U.S.C. 154(b) by 246 days.

(21) Appl. No.: 13/719,426

(22) Filed: Dec. 19, 2012

(65) Prior Publication Data
US 2014/0173341 A1    Jun. 19, 2014

(51) Int. Cl.
*G06F 11/00* (2006.01)
*G06F 11/20* (2006.01)

(52) U.S. Cl.
CPC ........ *G06F 11/2038* (2013.01); *G06F 11/2023* (2013.01); *G06F 11/2033* (2013.01); *G06F 11/2048* (2013.01); *G06F 11/2064* (2013.01); *G06F 11/2092* (2013.01); *G06F 11/2097* (2013.01)

(58) Field of Classification Search
USPC ..................................................... 714/6.3, 13
See application file for complete search history.

(56) References Cited

U.S. PATENT DOCUMENTS

| | | | |
|---|---|---|---|
| 5,504,861 A * | 4/1996 | Crockett et al. | 714/13 |
| 5,734,818 A | 3/1998 | Kern et al. | |
| 6,163,856 A * | 12/2000 | Dion et al. | 714/4.11 |
| 6,553,392 B1 * | 4/2003 | Mosher et al. | |
| 7,133,986 B2 | 11/2006 | Spear et al. | |
| 7,475,204 B2 | 1/2009 | Buah et al. | |
| 7,627,775 B2 * | 12/2009 | Kern et al. | 714/6.12 |
| 7,680,994 B2 | 3/2010 | Buah et al. | |
| 7,734,883 B2 | 6/2010 | Spear et al. | |
| 2005/0160305 A1 | 7/2005 | Soejima | |
| 2005/0198327 A1 | 9/2005 | Iwamura et al. | |
| 2007/0288710 A1 * | 12/2007 | Boyd et al. | 711/162 |
| 2008/0013365 A1 | 1/2008 | Yueh | |
| 2008/0077636 A1 | 3/2008 | Gupta et al. | |

(Continued)

OTHER PUBLICATIONS

IBM, "Near Zero Impact Backup and Data Replication Appliance," IPCOM000031978D, IP.com Prior Art Database, Oct. 18, 2004.

(Continued)

*Primary Examiner* — Bryce Bonzo
*Assistant Examiner* — Anthony J Amoroso
(74) *Attorney, Agent, or Firm* — Isaac J. Gooshaw; Matthew Mottice (57) ABSTRACT

Exemplary embodiments disclose a method and system for detecting a failure and resuming processing in a computing system encompassing at least two sites, a primary site and a secondary site. In a module, an exemplary embodiment generates a record of a logically consistent state and data of system components of the primary site periodically and transfers the record of a logically consistent state and data of system components of the primary site to the secondary site. In another module, an exemplary embodiment detects a failure in the primary site, halts the generation of the record of a logically consistent state and data of system components of the primary site periodically with a data freeze function, and resumes a processing of the primary site on the secondary site with secondary site components updated with a most recent logically consistent state and data of system components of the primary site.

18 Claims, 4 Drawing Sheets

(56) References Cited

U.S. PATENT DOCUMENTS

| | | | |
|---|---|---|---|
| 2008/0208923 A1 | 8/2008 | Watanabe et al. | |
| 2008/0209258 A1 | 8/2008 | Casale et al. | |
| 2008/0256384 A1* | 10/2008 | Branson et al. | 714/4 |
| 2009/0182789 A1* | 7/2009 | Sandorfi et al. | 707/204 |

OTHER PUBLICATIONS

Azagury et al., "Replication and Recovery of Database State Information in Fault Tolerant Clusters," IPCOM000106341D, IP.com Prior Art Database, original publication date: Oct. 1, 1993; IP.com electronic publication date: Mar. 21, 2005.

Zuikeviciute et al., "Correctness Criteria for Database Replication: Theoretical and Practical Aspects," Published in on the Move to Meaningful Internet Systems: OTM CoopIS, DOA, GADA, IS, and ODBASE 2008, pp. 639-656, Springer-Verlag, Berlin, Germany, 2008.

* cited by examiner

ENHANCED RECOVERY OF HIGHLY AVAILABLE COMPUTING SYSTEMS

FIELD OF THE INVENTION

The present invention relates generally to the recovery of cooperating computer systems after failure, and more particularly to the recovery of mirrored computer systems that enhance availability by replicating cooperating system components.

BACKGROUND OF THE INVENTION

Computing systems host software that runs modern economies and societies—affecting the real time day-to-day safety and welfare of millions of people. The continuous availability of many computer systems is essential to a society's functioning, health, and security. Sporadic unavailability, even for minutes, of some systems is dangerous and disruptive: air traffic control and financial systems are examples. Therefore, much thought and effort has been applied to enhancing the availability of some systems—and to decreasing downtime in the event of a failure.

The decreasing cost and increasing performance of computer system hardware over time has channeled efforts to increase system availability toward a model in which system components are replicated and dispersed geographically to avoid natural disasters and to avoid any one failure from causing a total system failure. In this model, software running on replicated controllers synchronizes and coordinates data movement and data replication among the replicated components to avoid total failure scenarios and to facilitate expeditious system recovery.

SUMMARY

Exemplary embodiments of the present invention disclose a method and system for detecting a failure and resuming processing in a computing system encompassing at least two sites, a primary site and a secondary site. In a module, an exemplary embodiment generates a record of a logically consistent state and data of system components of the primary site periodically. In another module, an exemplary embodiment transfers the record of a logically consistent state and data of system components of the primary site to the secondary site. In another module, an exemplary embodiment updates a state and data of system components of the secondary site with the contents of the record of a logically consistent state and data of system components of the primary site. In another module, an exemplary embodiment detects a failure in the primary site. In another module, an exemplary embodiment halts the generation of a record of a logically consistent state and data of system components of the primary site periodically with a data freeze function upon detecting a failure. In another module, an exemplary embodiment resumes a processing of the primary site on the secondary site with secondary site components updated with a most recent logically consistent state and data of system components of the primary site.

DETAILED DESCRIPTION

The Geographically Dispersed Parallel Sysplex (GDPS)® of IBM is a highly available system architecture based on such a model. A GDPS system incorporates redundant components and mechanisms within a site and at geographically dispersed sites whose activity can be synchronized periodically to a continuous sequence of known states. Doing so prepares the system to quickly replace failed components and to continue processing from a last known state. Exemplary embodiments of the present invention disclose a method and system for detecting a failure and resuming processing in a computing system encompassing at least two sites, a primary site and a secondary site.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational modules to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

To manage redundancy and synchronization in a GDPS system, users may form groups of system components (related, cooperating hardware and software components) that are managed as a consistent entity by system software to perform a function or run an application, e.g., a database. These groups are called consistency groups. A consistency group that is in a state from which the consistency group may be stopped and restarted without a risk of a logical fault (e.g., all writes previous to a specified completed write have completed and no following writes have, and logs and tables reflect activity to a specified processing point and not beyond) is deemed to be in a consistent state. A self-describing record that specifies a consistent state for a consistency group is a consistency group record. System software in a primary site of a GDPS system that employs consistency groups continuously generates a sequence of consistency group records which are sent as they are formed to a secondary site that can use them to establish a consistent state from which to continue the processing of the primary site in the event of a failure.

For example, in a GDPS formed by two dispersed sites, a primary site A, and a secondary site B, a consistency group record is formed periodically in site A to encapsulate updates to site A's system data and state at a particular point in time and is sent to site B, to update its components to the known consistent state A had when the record was composed. The consistency group record describes a consistent state and the operations to be performed (e.g., disk writes or updates to log files) to update a previous consistent state to a current consistent state. These records are sent sequentially and frequently so that site B can assume the processing of site A quickly and near to the state A was in when a failure was detected.

A monitoring facility detects system failures, and in the event of a failure, implements a freeze function that stops the generation of consistency group records. The last consistency group record formed before the freeze now reflects the last known consistent state of a system before the failure and is used to recover from the failure. The quick resumption of processing in the event of a failure is advantageous in many situations.

Figure 1:
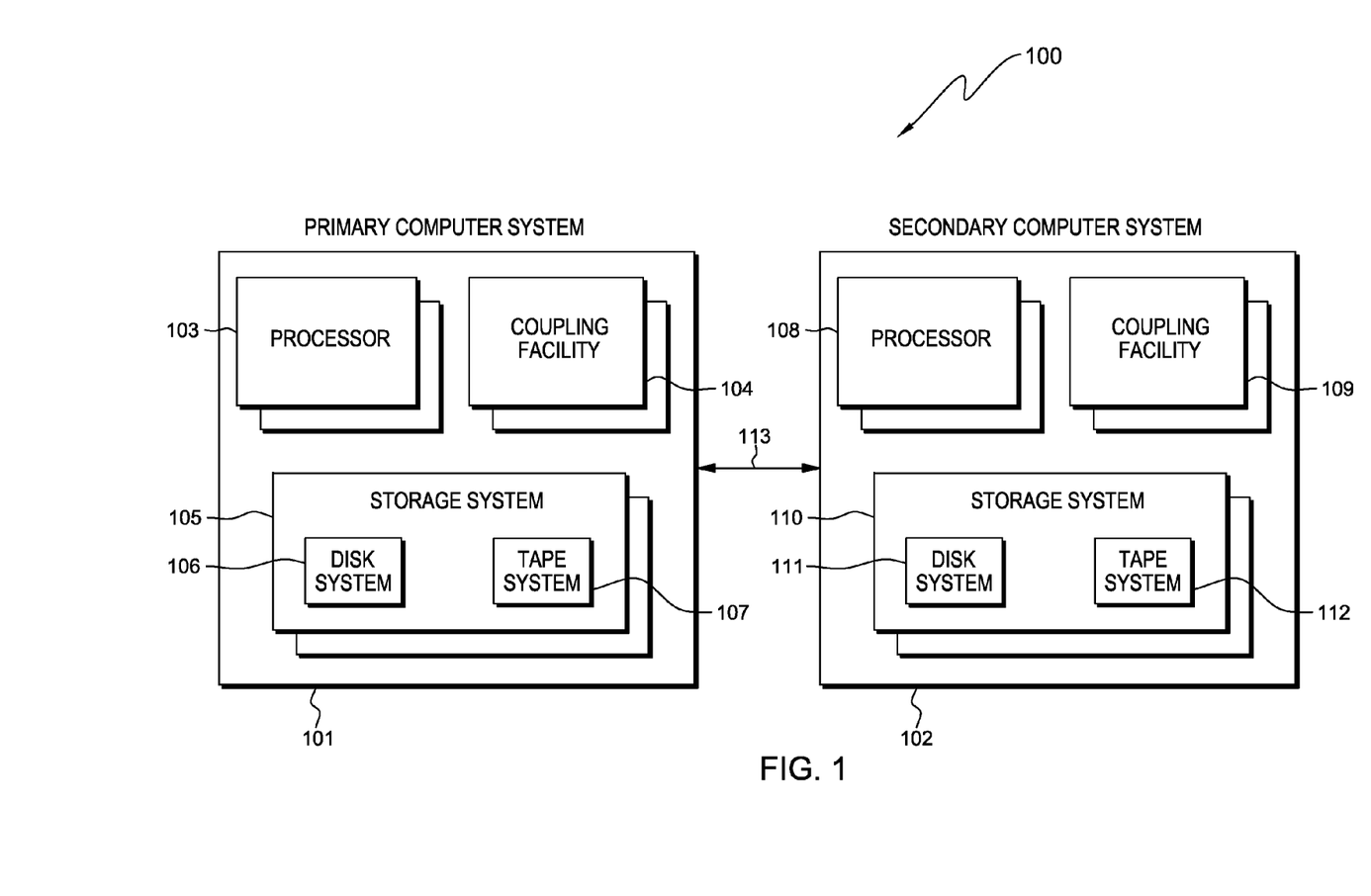
FIG. 1 is a block diagram of a dispersed computer system containing a primary computer system and a secondary computer system, in accordance with an embodiment of the present invention.

FIG. 1 depicts a highly available computer system 100 comprised of two computer systems at two geographically dispersed sites, a primary computer system 101 at a primary site and a secondary computer system 102 at a secondary site. The primary computer system includes at least one processor 103, at least one coupling facility 104, and at least one storage system 105. The storage system includes at least one disk system 106 and at least one tape system 107. The secondary computer system 102 in FIG. 1 system includes at least one processor 108, at least one coupling facility 109, and at least one storage system 110. The storage system is comprised of at least one disk system 111 and at least one tape system 112. Primary computer system 101 uses a communications link 113 between primary computer system 101 and secondary computer system 102 to keep secondary computer system 102 updated with the state and data of the primary computer system 101.

An example of a highly available computer system 100 is an IBM Geographically Dispersed Parallel Sysplex® (GDPS) system implementing Peer-to-peer Remote Copy (PPRC). High availability provided by a GDPS/PPRC system is often desired when executing finance-oriented database applications, applications in which human safety is at risk, and many other applications. Depending on system configuration and software and hardware implemented to achieve redundancy, communications link 113 between sites participating in a GDPS/PPRC system may be over fiber-optic, microwave, and satellite communications links. Many site configurations and inter-site communication configurations are possible in a dispersed system and are tailored to meet to a customer's requirements for response time, throughput, (given a customer's workload) and desired level of availability.

Exemplary embodiments of coupling facility 104 and/or 109 provide services to operating systems and middleware so that system software can manage where applications run, manage resources the applications use, synchronize operations between processors, and to temporarily cache information that enables an efficient use of system resources.

Figure 2:
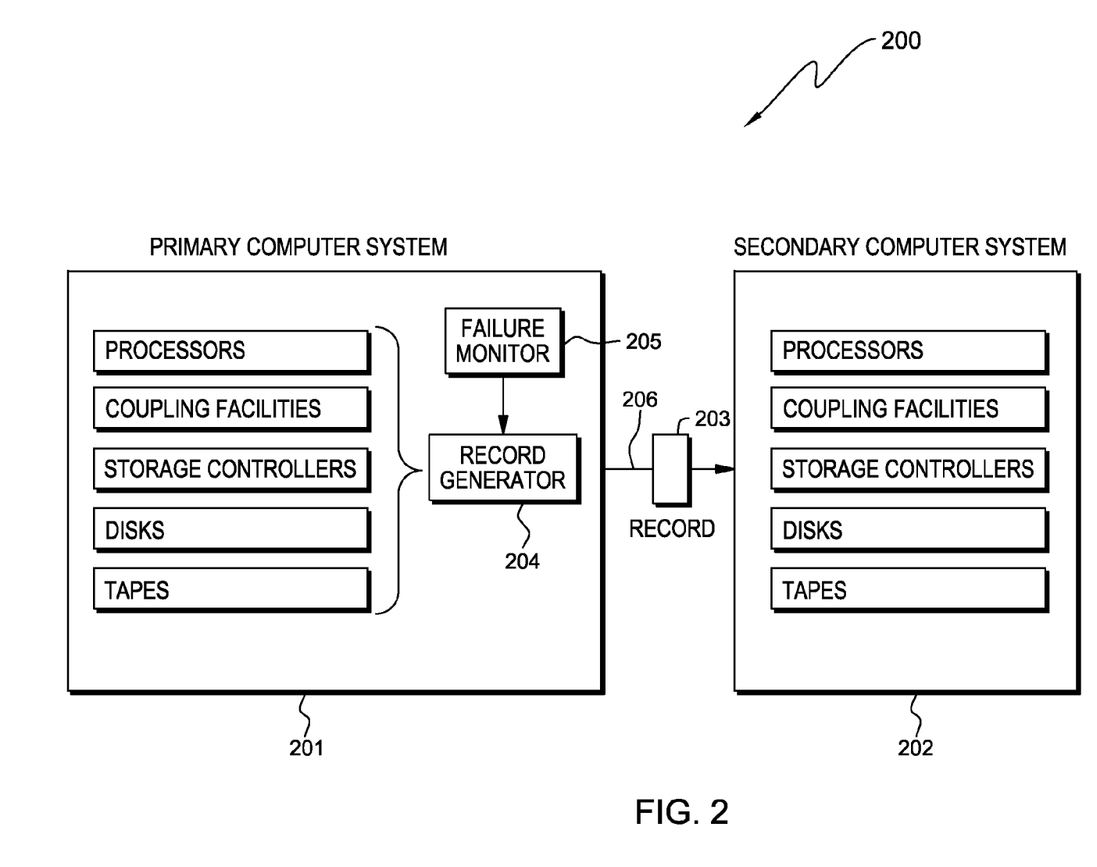
FIG. 2 is a block diagram of a dispersed computer system containing a primary computer system and a secondary computer system in which logically consistent records are generated, in accordance with an embodiment of the present invention.

In a computer system 200 implementing an exemplary embodiment of the present invention, shown in FIG. 2, a record generator 204 in primary computing system 201 periodically generates a record 203. Exemplary embodiments of record 203 include a logically consistent state information and data that contains the information necessary to update the system components of secondary computer system 202 to a recent logically consistent state and data of primary computer system 201 prior to the record 203 being generated. A computer system that is in a state from which the computer system may be stopped and restarted without a risk of a logical fault (e.g., all writes previous to a specified completed write have completed and no following writes have, and logs and tables reflect activity to a common specified processing point and not beyond) is in a logically consistent state. Record 203 is transferred to secondary computer system 202 over a communications link 206.

Exemplary embodiments of record 203 may include permanent data or temporary data. Permanent data is defined as data that is written and stored in a disk subsystem, tape subsystem, etc. Temporary data is defined as cached data. Some examples of permanent data may include, but are not limited to: network information, configuration files, etc. Some examples of temporary data may include, but are not limited to: emails, documents, recent hypertext markup language documents, etc.

A failure monitor 205 monitors primary computer system 201 for failures. In exemplary embodiments, failure monitor 205 monitors alerts from the disk subsystem, tape subsystem, host software messages, etc. for failures. If a failure occurs, failure monitor 205 implements a quiescing function that halts a generation and transmission of record to secondary computer system 202. In exemplary embodiments, the quiescing function is a data freeze function that quiesces all primary computing system 201 functions and halts a generation and transmission of records to secondary computer system 202. In other exemplary embodiments, the quiescing function may be a signal from primary computer system 201 to secondary computer system 202, or a lack of a heartbeat signal, etc.

Figure 3:
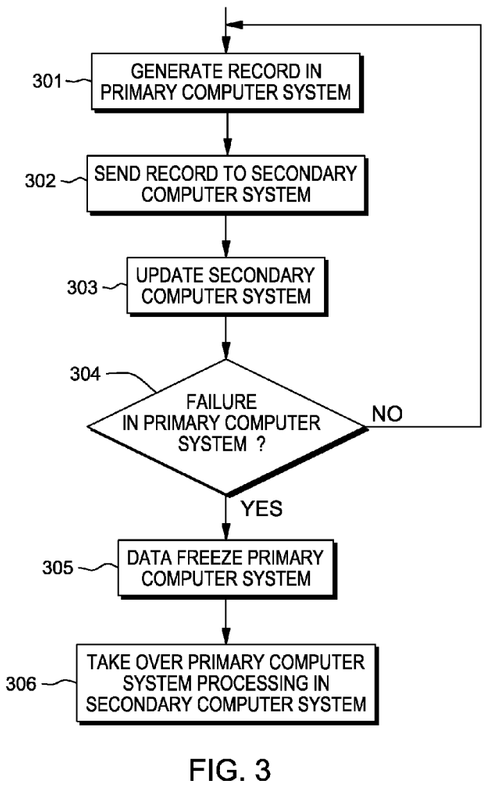
FIG. 3 is a flow diagram that depicts modules taken in preparation for and recovery from a failure in a primary computer system in a dispersed computer system, in accordance with an embodiment of the present invention.

The modules of the method for detecting a failure and resuming processing in a computing system encompassing at least two sites, a primary site and a secondary site are shown in FIG. 3. In exemplary embodiments the modules of the method for detecting a failure and resuming processing in a computing system encompassing at least two sites initiates during start-up of primary computer system 201. In another embodiment, the method initiates when primary secondary computer system 202. In module 301, record generator 204 generates a record 203 of a logically consistent state and data of primary computer system 201. In module 302, record 203 of a logically consistent state and data is transferred to secondary computer system 202. In module 303, components of secondary computer system 202 are updated with a content of record 203 of a logically consistent state and data of primary computing system 201. In module 304, a failure in primary computer system 201 is detected by failure monitor 205. In module 305, a Data Freeze function is generated by failure monitor 205 in response to a failure which quiesces primary computing system 201 and halts a generation and transmission of records to secondary computing system 202. In module 306, secondary computing system 202 resumes a processing of primary computing system 201 at a point described in a last received record of a logically consistent state and data of primary computing system 201.

The forgoing description is an example only, and those skilled in the art understand that there are many ways to generate a logically consistent record of state and data of various computer system components and groups of computer system components to achieve a desired level of confidence in system availability and computer system restoration delay after specific types of failures and combinations of failures.

Figure 4:
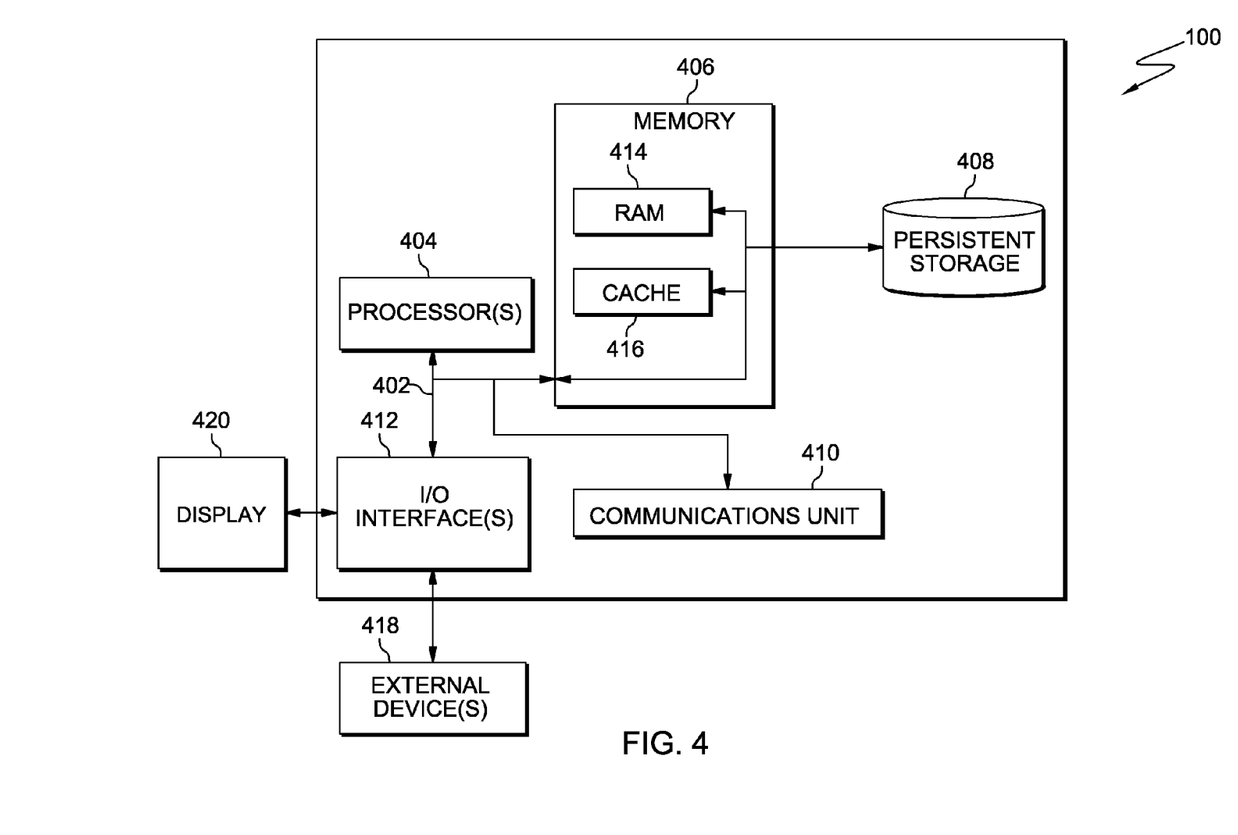
FIG. 4 depicts a block diagram of components of a computing device, in accordance with an embodiment of the present invention.

FIG. 4 depicts a block diagram of components of computer system 100 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer systems 101, 102, 201 and 202 include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Record generator 204 and failure monitor 205 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of computer system 100. In these examples, communications unit 410 includes one or more network interface cards. Communications unit 410 may provide communications through the use of either or both physical and wireless communications links. Record generator 204 and failure monitor 205 may be downloaded to persistent storage 408 through communications unit 410.

I/O interface(s) 412 allows for input and output of data with other devices that may be connected to computer systems 101, 102, 201 and 202. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., record generator 204 and failure monitor 205 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for detecting a failure and resuming processing in a computing system encompassing at least two sites, a primary site and a secondary site, the method comprising:
    generating a record of a logically consistent state and data of system components of the primary site periodically, wherein the logically consistent state and data of system components of the primary site includes a state of a software, and wherein the record identifies a plurality of groups of cooperating hardware and software components that are managed as consistent entities by system software of the primary site to perform functions such that a group included in the plurality of groups of cooperating hardware and software components may be stopped and restarted with a reduced risk of a logical fault;
    transferring the record of a logically consistent state and data of system components of the primary site to the secondary site such that activity on the primary site is synchronized periodically with the secondary site to reflect a continuous sequence of known states of plurality of groups of cooperating hardware and software components;
    updating a state and data of system components of the secondary site with the contents of the record of a logically consistent state and data of system components of the primary site;
    detecting a failure in the primary site;
    halting the generation of the record of a logically consistent state and data of system components of the primary site periodically with a data freeze function upon detection of the failure in the primary site, wherein the data freeze function quiesces primary computing system functions of the primary site and halts generation of records at the primary site and transmission of records to the secondary site; and
    resuming a processing of the primary site on the secondary site with secondary site components updated with a most recent logically consistent state and data of system components of the primary site.

2. The method of claim 1, wherein the primary site and the secondary site contain at least one coupling facility.

3. The method of claim 1, wherein the primary site and the secondary site contain at least one tape unit.

4. The method of claim 1, wherein the primary site and the secondary site contain at least one internet switch.

5. The method of claim 1, wherein the record of a logically consistent state and data of selected system components of the primary site is generated periodically such that each record in a series of records represents a predetermined interval of time in which the logically consistent state and data of the group included in the plurality of groups of cooperating hardware and software components is monitored, wherein the record describes a consistent state of the group and one or more operations to be performed by the group.

6. The method of claim 1, wherein a plurality of sequential records is combined into a composite record, with redundant information among the plurality of sequential records eliminated and the composite record is transferred to the secondary site.

7. A computer system to detect a failure in and resuming processing in a computing system encompassing at least two sites, a primary site and a secondary site, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:
    program instructions to generate the record of a logically consistent state and data of system components of the primary site periodically, wherein the logically consistent state and data of system components of the primary site includes a state of a software, and wherein the record identifies a plurality of groups of cooperating hardware and software components that are managed as consistent entities by system software of the primary site to perform functions such that a group included in the plurality of groups of cooperating hardware and software components may be stopped and restarted with a reduced risk of a logical fault;
    program instructions to transfer a record of a logically consistent state and data of system components of the primary site to the secondary site such that activity on the primary site is synchronized periodically with the secondary site to reflect a continuous sequence of known states of plurality of groups of cooperating hardware and software components;
    program instructions to update a state and data of system components of the secondary site with the contents of the record of a logically consistent state and data of system components of the primary site;
    program instructions to detect a failure in the primary site;
    program instructions to halt the generation of the record of a logically consistent state and data of system components of the primary site periodically with a data freeze function upon detection of the failure in the primary site, wherein the data freeze function quiesces primary computing system functions of the primary site and halts generation of records at the primary site and transmission of records to the secondary site; and program instructions to resume a processing of the primary site on the secondary site with secondary site components updated with a most recent logically consistent state and data of system components of the primary site.

8. The system of claim 7, wherein the primary site and the secondary site contain at least one coupling facility.

9. The system of claim 7, wherein the primary site and the secondary site contain at least one tape unit.

10. The system of claim 7, wherein the primary site and the secondary site contain at least one internet switch.

11. The system of claim 7, wherein the record of a logically consistent state and data of selected system components of the primary site is generated periodically such that each record in a series of records represents a predetermined interval of time in which the logically consistent state and data of the group included in the plurality of groups of cooperating hardware and software components is monitored, wherein the record describes a consistent state of the group and one or more operations to be performed by the group.

12. The system of claim 7, wherein a plurality of sequential records is combined into a composite record, with redundant information among the plurality of sequential records eliminated and the composite record is transferred to the secondary site.

13. A computer program product to detect a failure in and resuming processing in a computing system encompassing at least two sites, a primary site and a secondary site, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to generate the record of a logically consistent state and data of system components of the primary site periodically, wherein the logically consistent state and data of system components of the primary site includes a state of a software, and wherein the record identifies a plurality of groups of cooperating hardware and software components that are managed as consistent entities by system software of the primary site to perform functions such that a group included in the plurality of groups of cooperating hardware and software components may be stopped and restarted with a reduced risk of a logical fault;

program instructions to transfer a record of a logically consistent state and data of system components of the primary site to the secondary site such that activity on the primary site is synchronized periodically with the secondary site to reflect a continuous sequence of known states of plurality of groups of cooperating hardware and software components;

program instructions to update a state and data of system components of the secondary site with the contents of the record of a logically consistent state and data of system components of the primary site;

program instructions to detect a failure in the primary site;

program instructions to halt the generation of the record of a logically consistent state and data of system components of the primary site periodically with a data freeze function upon detection of the failure in the primary site, wherein the data freeze function quiesces primary computing system functions of the primary site and halts generation of records at the primary site and transmission of records to the secondary site; and program instructions to resume a processing of the primary site on the secondary site with secondary site components updated with a most recent logically consistent state and data of system components of the primary site.

14. The computer program product of claim 13, wherein the primary site and the secondary site contain at least one coupling facility.

15. The computer program product of claim 13, wherein the primary site and the secondary site contain at least one tape unit.

16. The computer program product of claim 13, wherein the primary site and the secondary site contain at least one internet switch.

17. The computer program product of claim 13, wherein the record of a logically consistent state and data of selected system components of the primary site is generated periodically such that each record in a series of records represents a predetermined interval of time in which the logically consistent state and data of the group included in the plurality of groups of cooperating hardware and software components is monitored, wherein the record describes a consistent state of the group and one or more operations to be performed by the group.

18. The computer program product of claim 13, wherein a plurality of sequential records is combined into a composite record, with redundant information among the plurality of sequential records eliminated and the composite record is transferred to the secondary site.

* * * * *